United States Patent
Connell et al.

(10) Patent No.: US 11,420,652 B2
(45) Date of Patent: Aug. 23, 2022

(54) SYSTEM AND METHOD OF CONTROL FOR AUTONOMOUS OR REMOTE-CONTROLLED VEHICLE PLATFORM

(71) Applicants: DEERE & COMPANY, Moline, IL (US); CARNEGIE MELLON UNIVERSITY, Pittsburgh, PA (US)

(72) Inventors: Richard Connell, Moline, IL (US); Michael M. Miller, Moline, IL (US); Joshua Lawson, Moline, IL (US); Suryansh Saxena, Pittsburgh, PA (US); Matthew Levine, Pittsburgh, PA (US); Prathamesh Kini, Pittsburgh, PA (US); Raphael Bouterige, Pittsburgh, PA (US); Matthew Glisson, Pittsburgh, PA (US); Raymond Russell, Pittsburgh, PA (US); James Ketterer, Pittsburgh, PA (US); Herman Herman, Gibsonia, PA (US)

(73) Assignees: DEERE & COMPANY, Moline, IL (US); CARNEGIE MELLON UNIVERSITY, Pittsburgh, PA (US)

(*) Notice: Subject to any disclaimer, the term of this patent is extended or adjusted under 35 U.S.C. 154(b) by 57 days.

(21) Appl. No.: 16/917,862

(22) Filed: Jun. 30, 2020

(65) Prior Publication Data
US 2021/0061307 A1     Mar. 4, 2021

Related U.S. Application Data

(60) Provisional application No. 62/894,685, filed on Aug. 30, 2019.

(51) Int. Cl.
*B60W 60/00*     (2020.01)
*B60W 30/08*     (2012.01)
(Continued)

(52) U.S. Cl.
CPC ........ *B60W 60/0015* (2020.02); *B60W 30/08* (2013.01); *G06V 20/58* (2022.01);
(Continued)

(58) Field of Classification Search
CPC .. A01B 69/008; A01B 79/005; A01M 7/0085; A01M 7/0089; B60W 2420/52;
(Continued)

(56) References Cited

U.S. PATENT DOCUMENTS

| | | | |
|---|---|---|---|
| 8,761,439 B1 * | 6/2014 | Kumar | G06T 7/73 382/103 |
| 8,825,265 B1 * | 9/2014 | Ferguson | G05D 1/0214 701/26 |

(Continued)

OTHER PUBLICATIONS

"Perception, Planning, Control, and Coordination for Autonomous Vehicles" Pendleton, S et al. (Year: 2017).*
(Continued)

*Primary Examiner* — Babar Sarwar
(74) *Attorney, Agent, or Firm* — Michael G. Monyok

(57) ABSTRACT

A system and method for controlling a vehicle platform, the system comprising on onboard controller and an off-board controller that work together to provide autonomous navigation in fields or similar areas where the vehicle is deployed, perception for obstacle detection and avoidance, and a user interface for user/vehicle interaction and control.

20 Claims, 3 Drawing Sheets

(51) Int. Cl.
*G06V 20/58* (2022.01)
*H04W 4/40* (2018.01)

(52) U.S. Cl.
CPC ..... *B60W 2420/52* (2013.01); *B60W 2520/14* (2013.01); *B60W 2520/18* (2013.01); *H04W 4/40* (2018.02)

(58) Field of Classification Search
CPC ......... B60W 2520/14; B60W 2520/18; B60W 30/08; B60W 60/0015; G06K 9/00805; H04W 4/029; H04W 4/40
See application file for complete search history.

(56) References Cited

U.S. PATENT DOCUMENTS

| | | | | |
|---|---|---|---|---|
| 9,056,395 | B1* | 6/2015 | Ferguson | B60W 30/16 |
| 10,169,680 | B1* | 1/2019 | Sachdeva | G06F 3/04845 |
| 10,491,885 | B1* | 11/2019 | Hicks | H04N 13/275 |
| 10,921,817 | B1* | 2/2021 | Kangaspunta | G01S 17/931 |
| 10,929,711 | B1* | 2/2021 | Pfeiffer | G06N 20/00 |
| 10,936,902 | B1* | 3/2021 | Bagwell | G06K 9/6254 |
| 11,087,494 | B1* | 8/2021 | Srinivasan | G06K 9/00791 |
| 2004/0193348 | A1* | 9/2004 | Gray | G05D 1/0219 |
| | | | | 701/50 |
| 2005/0273253 | A1* | 12/2005 | Diekhans | G01C 21/20 |
| | | | | 701/50 |
| 2014/0063232 | A1* | 3/2014 | Fairfield | B60T 7/18 |
| | | | | 348/118 |
| 2014/0067187 | A1* | 3/2014 | Ferguson | B60W 30/12 |
| | | | | 701/28 |
| 2014/0214259 | A1* | 7/2014 | Trepagnier | G05D 1/0248 |
| | | | | 701/26 |
| 2018/0328743 | A1* | 11/2018 | Sullivan | G05D 1/0214 |
| 2018/0329428 | A1* | 11/2018 | Nagy | G05D 1/0088 |
| 2019/0139403 | A1* | 5/2019 | Alam | G06T 17/005 |
| 2019/0146513 | A1* | 5/2019 | Tomita | G05D 1/0278 |
| | | | | 701/50 |
| 2019/0285752 | A1* | 9/2019 | Chattopadhyay | G06K 9/00805 |
| 2019/0332118 | A1* | 10/2019 | Wang | G05D 1/0214 |
| 2020/0293059 | A1* | 9/2020 | Wang | G06K 9/00201 |

OTHER PUBLICATIONS

International Search Report and Written Opinion of the International Searching Authority for PCT Application PCT/US2020/040381 dated Sep. 16, 2020.

Pendelton, S. et al. "Perception, planning, control, and coordination for autonomous vehicles." Machines 5, No. 1 (2017): 6.

* cited by examiner

SYSTEM AND METHOD OF CONTROL FOR AUTONOMOUS OR REMOTE-CONTROLLED VEHICLE PLATFORM

CROSS-REFERENCE TO RELATED APPLICATIONS

This application claims the benefit under 35 U.S.C. § 119 of U.S. Provisional Application No. 62/894,685, filed Aug. 30, 2019, which is incorporated herein by reference.

STATEMENT REGARDING FEDERALLY SPONSORED RESEARCH

Not applicable.

BACKGROUND OF THE INVENTION

The invention relates to a system and method of control for a vehicle platform. More specifically, the invention relates to a system and method of control for an autonomous or remote-controlled vehicle platform that can be used in agricultural applications.

In some prior art, agricultural vehicles can be large platforms, particularly since they must include a driver's cabin with associated manual controls. Due to the large size, these types of vehicles may be associated with wheels that unduly compact the soil, which can detract from favorable growing conditions of plants or crops. These agricultural vehicles may also lack integrated control systems, which can result in swaths of treated crop, spray patterns that are not parallel to each other, or patterns that do not track a target path plan, such as linear row segments, contour row segments, curved row segments, or spiral row segments, for example. Further, some vehicles may not provide a system and method of controlling the vehicle for autonomous or remote-controlled operation. Therefore, it would be advantageous to develop a system and method of controlling a vehicle platform.

BRIEF SUMMARY

According to one embodiment of the present invention is a system for controlling a vehicle platform comprising an on-board controller and an off-board controller, which work in tandem to provide autonomous or remote-controlled navigation capabilities for the vehicle platform.

DETAILED DESCRIPTION

Figure 1A:
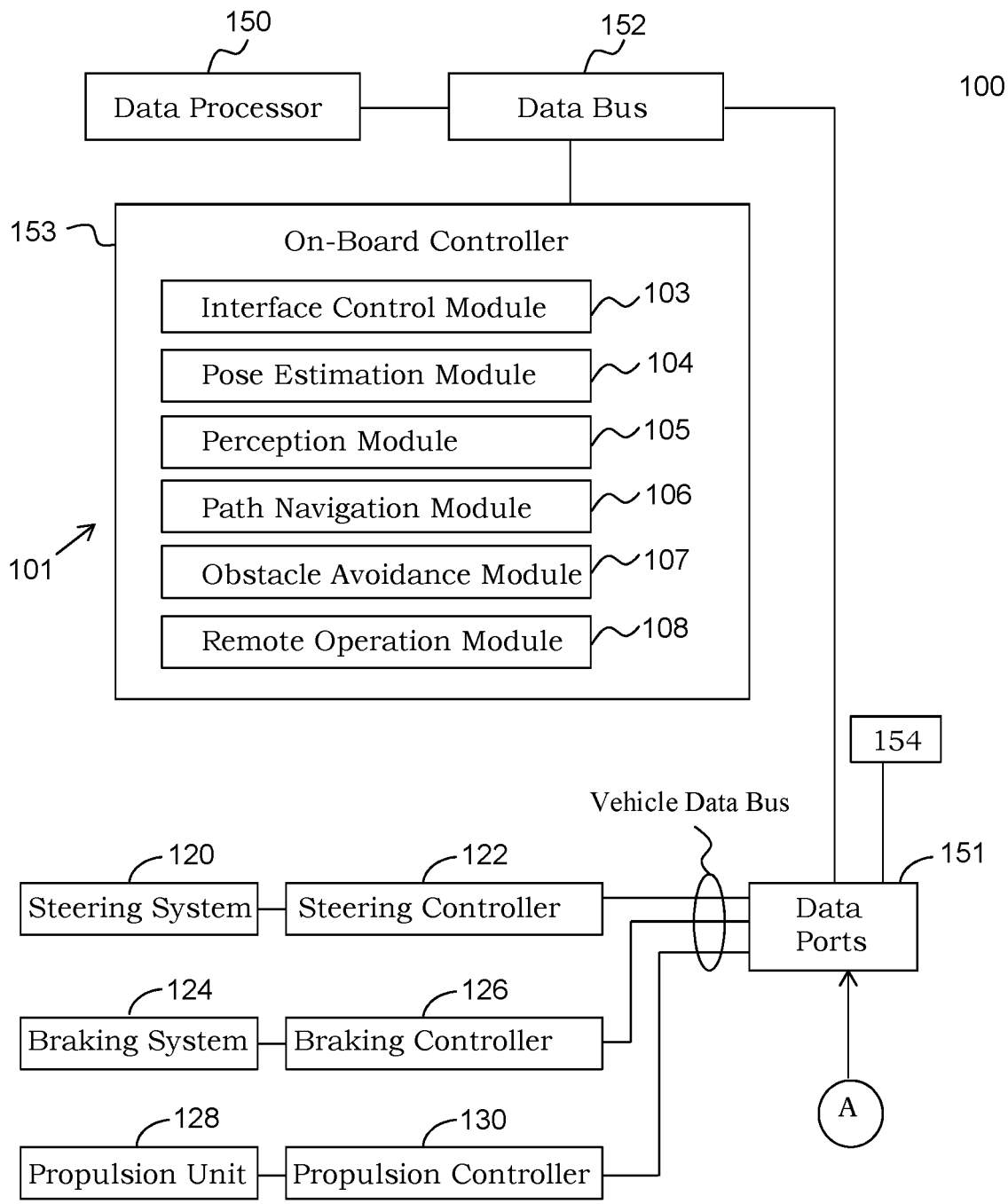
FIGS. 1A-1B are block diagrams of a control system for the autonomous or remote-controlled vehicle.

According to one embodiment of the present invention is a system 100 for controlling a vehicle platform 11 comprising an on-board controller 101 and an off-board controller 102. In one embodiment, the system 100 further comprises a data processor 150, a data storage device 153, and data ports 151 that are coupled to a data bus 152. The data processor 150, data storage device 153, and data ports 151 can communicate with each other via the data bus 152. The off-board controller 102 may be coupled to the data port 151 via a wireless link 154, such as a pair of wireless transceivers. A user interface 155 associated with the off-board controller 102 may comprise a display, keypad, touch screen display, keyboard, pointing device, or another device to support an operator remotely interfacing with the vehicle 11.

In one embodiment, the data processor 150 comprises a microcontroller, a microprocessor, a programmable logic array, a logic device, an arithmetic logic unit, a digital signal processor, an application specific integrated circuit, or another electronic device for inputting, outputting, processing or manipulating data. The data storage device 153 may comprise electronic memory, nonvolatile random access memory, a magnetic storage device, a magnetic disc drive, an optical storage device, an optical disc drive, or another suitable storage device or medium. The data storage device 153 can support electronic modules, store software instructions or support data modules. The data ports 151 may comprise a transceiver, the combination of a transceiver and buffer memory, or a transmitter and a receiver, for example.

As shown in FIG. 1A, one embodiment of the on-board controller 101 comprises an interface control module 103, a pose estimation module 104, a perception module 105, a path navigation module 106, an obstacle avoidance module 107, and a remote operation module 108. The off-board controller 102, depicted in FIG. 1B, comprises a mission configuration module 110, a static mission module 111, a machine state module 112, and an override controls module 113.

Figure 2:
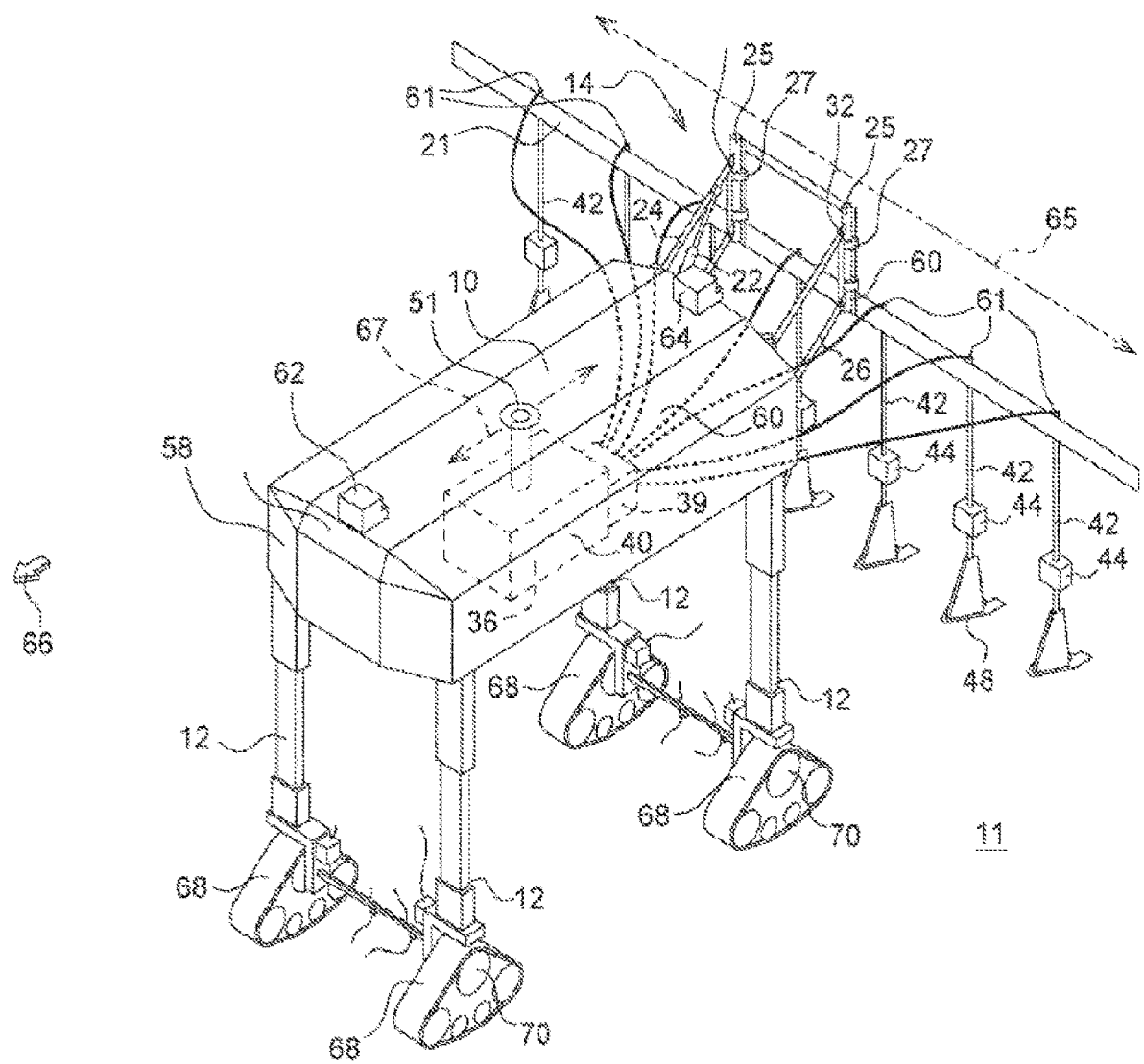
FIG. 2 is a perspective top, rear, and side view of one embodiment of an autonomous or remote-controlled vehicle, such as a sprayer.

The system 100 may be used to control a vehicle, such as the vehicle platform 11 shown in FIG. 2. In the embodiments disclosed in this document, a vehicle platform 11 may comprise an autonomous robotic machine that is capable of applying fertilizer, herbicides, pesticides, seeds, or other crop care inputs both prior to crop planting and emergence as well as after crop emergence. The vehicle platform 11 or vehicle can be configured as a light-weight vehicle that is well-suited for reduced soil compaction during field operations, by eliminating the weight of a cab for the human operator and operator. For many configurations, the robotic machine can shed the weight of climate control systems, infotainment systems, and various operator controls associated with the cab. In some configurations, the tracked assemblies of the vehicle can provide less than 5 pounds per square inch (PSI) ground pressure or even as low as 3 PSI ground pressure in certain configurations. The reduced ground pressure allows the vehicle platform 11 to be operated in conditions where the soil structure would not normally allow field entrance because of concerns over soil compression or damage. The control system 100 is not limited to agricultural vehicles and may be used to control other vehicle platforms, such as construction, forestry, and turf vehicles, for example.

In the example shown in FIG. 2, the vehicle platform 11 comprises a central body 10 having a first side 58 (e.g., front) and a second side 60 (e.g., rear) spaced apart from the first side 58 by a fixed known distance. A plurality of adjustable legs 12 extends downward from the central body 10. Each adjustable leg 12 has a corresponding leg actuator, such as a linear actuator, an electric motor with a screw, or a hydraulic cylinder with an electrohydraulic interface, to adjust a respective vertical height of each adjustable leg 12. For example, the leg actuators can be used to maintain a level attitude of the vehicle based on measurements of any of the following: motion sensors, first location-determining receiver 62, or second location-determining receiver 64.

Each adjustable leg 12 terminates in a rotatable track assembly 68 (e.g. rotatable with respect to the vertical axis 30 and rotatable with respect to a horizontal axis associated with driving the track or belt) or rotatable wheel. If the track assembly 68 is rotatable with respect to the vertical axis to steer the vehicle, an actuator (e.g., hydraulic actuator) or electric motor is used at or above two or more track assemblies 68, such that a stator (of the electric motor or actuator) is associated with an upper portion of the leg 12 and rotor (of an electric motor or actuator) is coupled to a lower portion of the leg 12 or the respective tracked assembly. In some configurations, the track assembly 68 may be referred to as a tracked wheel, a continuous track or a tank tread. Each track assembly 68 is independently drivable or rotatable by a drive unit 70, such as an electric motor or a hydraulic motor. Further, in some configurations, the vehicle can be steered (e.g., differentially steered) by applying differential rotational energy (e.g., different rotational velocities) to the ground with respect to different track units.

In one embodiment, a first location-determining receiver 62 is associated with or near the first side 58 on the top of the vehicle 11; a second location determining receiver 64 is associated with or near the second side 60 on top of the vehicle 11. The first location-determining receiver 62, alone or together with second location-determining receiver 64 is configured to determine a position or angular orientation in the horizontal plane of the Earth of the vehicle or central body 10 with respect to a reference angle, such as magnetic North. For example, the first location-determining receiver 62, the second location-determining receiver 64, or both may comprise a satellite navigation receiver, such as global navigation satellite system receiver (GNSS) or Global Positioning System (GPS) receiver, where the satellite navigation receiver may have a wireless receiver for receiving a correction signal, such as a differential correction signal or a precise point positioning (PPP) signal. In one embodiment, the location-determining receivers (62, 64) may be supplemented with additional or supplemental sensors, such as dead-reckoning sensors, odometers, gyroscopes, accelerometers, tilt, roll and yaw sensors, and/or inertial measurement unit (IMU) to facilitate determination of position or angular orientation in conjunction with the location-determining receivers (62, 64). Additional sensors such as an imaging system, at least one stereo camera, radar, lidar, and other systems that acquire data about the environment surrounding the vehicle 11 may be used in some embodiments.

In the example embodiment illustrated in FIG. 2, the central body 10 covers a tank 36, such as a generally cylindrical tank, for holding a crop input, a fluid to be pumped or pressurized fluid, such as anhydrous ammonia. The crop may have an optional input port 51 with a cap that can be removed to fill the tank 36. Crop input or fluid refers to fertilizer, fungicide, pesticide, insecticide, herbicide, nitrogen, potassium, phosphorus, minerals, nutrients, soil amendments, chemicals or other agronomic treatments for plants, seeds, roots or soil. The tank 36 can hold a pressurized fluid or fluid to be pumped by a pump 39. In one configuration, the central body 10 has central hollow region 40 associated with its lower side, and wherein the central hollow region 40 is adapted to receive removably a tank 36 for holding fluid, such as a crop input to be sprayed or a seed to be planted.

A plurality of supply lines 42 and tubes 61 are arranged to supply the respective nozzle assemblies with a pumped or pressurized fluid from the tank 36 or a pump associated with the tank 36. A manifold 44 coupled to the vertical supply lines 42 distributes, switches or directs the pumped or pressurized fluid to one or more nozzles 48 of each nozzle assembly or to the entire nozzle assembly. The manifold 44 may include one or more valves, such as electromechanical valves or solenoid operated valves for controlling the flow of pumped or pressurized fluid to respective nozzles 48 or nozzle assemblies. For example, in one configuration each nozzle assembly includes a pair of nozzles 48 facing in opposite directions.

Further shown in FIG. 2 is a pivotable arm assembly 14 comprising a first arm 24, second arm 26, vertical rods 25, collars 27, a support beam 21, and optional frame, which is used to support the nozzle assemblies. The support beam 21 extends in a transverse direction 65 that is generally perpendicular to a longitudinal axis 67 of the central body 10 in a forward direction of travel 66 of the vehicle platform 11. An arm actuator 22 is arranged to control a transverse position of the support beam 21. Accordingly, during adjacent passes or swaths (e.g., parallel swaths) of the vehicle 11 through the field, the nozzle assemblies can be adjusted laterally without laterally moving the vehicle 11 to align the nozzle assemblies with the row of plants.

The onboard controller 101 may receive position data, motion data, and attitude data (e.g., yaw or heading) from the first location-determining receiver 62, the second location-determining receiver 64, the motion sensors, or other vehicle sensors. For example, the data storage 153 may store observed (e.g., time-stamped) position data, motion data, and attitude data (e.g., yaw or heading) from the first location-determining receiver 62, the second location-determining receiver 64, and/or the motion sensors for communication via the data ports 151 to the data processor 150 or any module or modules.

The onboard controller 101 generates command data or command signals to send steering commands to the steering controller 122 to track the path plan, target heading, or target yaw. In turn, the steering controller 122 communicates with the steering system 120, such as an electrohydraulic steering system or an electrical steering system. In one example, the steering system 120 comprises an electric motor that drives one or more tracks, where the direction of the vehicle can be controlled by differential steering with respect to the tracks to steer or direct the vehicle in accordance with a target heading provided by the onboard controller 101 or data processor 150. In another example, the steering system 120 comprises an actuator that rotates a portion, such as bottom portion of a respective leg 12 about a vertical axis to steer or direct the vehicle 11 in accordance with a target heading provided by the onboard controller 101 or data processor 150 consistent with a path plan or mission to cover a field or area with a crop input.

The onboard controller 101 can send command data or command signals to the steering controller 122, the braking controller 126, and the propulsion controller 130 via one or more data ports 151 or via the vehicle data bus 152 such that the vehicle 11 tracks a path plan. A braking controller 126 is coupled to a braking system 124, such as an electrohydraulic braking system, an electrical braking system or a mechanical braking system. The braking controller 126 is coupled to a data port 151. A propulsion controller 130 is coupled to a propulsion unit 128, such as one more electric drive motors, an internal combustion engine, or an internal combustion engine that provides rotational mechanical energy to a generator or an alternator that provides electrical energy to one or more electric drive motors. The propulsion controller 130 is coupled to a data port 151.

Referring again to FIG. 1A-FIG. 1B, in one embodiment, the system 100 accesses, creates or receives a path plan to guide the vehicle platform 11 along a target path in performing spraying, planting or another task in one or more fields. The system 100 further provides a user interface for human-vehicle interaction and control. Human control is performed via the off-board controller 102, in one embodiment. The on-board controller 101 is the central computing resource that is responsible for localizing the vehicle 11, enabling perception for obstacle detection, for dynamic path generation and smoothing, and controlling and monitoring the vehicle navigation.

As shown in FIG. 1A, the on-board controller 101 includes an interface control module 103, which is the main controls interface with the low-level machine controllers (120, 122, 124, 126, 128, and 130) and the other modules of the onboard controller 101 and off-board controller 102. The interface control module 103 maintains the state machine, enforces synchronization between the low-level machine controllers (120, 122, 124, 126, 128, and 130) and high-level controllers (101, 102), and serialization and deserialization of data transmitted across the data bus 152. The interface control module's output directly affects the state and navigation of the vehicle 11.

The pose estimation module 104 estimates the pose of the vehicle 11 with respect to a global frame. In one embodiment, pose estimation is accomplished using an Extended Kalman Filter (EKF) that assumes a uniform velocity model, and believe state estimates are generated using differential location updates. The measurement update of the EKF can be obtained from GPS data provided by the first location-determining receiver 62 or second location-determining receiver 64. In an alternative embodiment, the EKF can also use data from the IMU for a prediction update. The pose estimation module 104 may also work with different motion model profiles for the vehicle, including Ackerman steer and articular steer profiles.

The perception module 105 establishes a basis to examine and understand the environment in which the vehicle 11 is operating. This functionality is the basis for safe autonomous operation. For example, the perception module 105 allows the vehicle platform 11 to recognize positive and negative obstacles in its environment over time and relay critical navigability information to the decision-making components of the system. To accomplish this functionality, the perception module 105 provides obstacle detection to: operate in geometric space without reliance on image features, but without precluding the incorporation of such information; consistently identify objects of several classes, including people, vehicles, buildings, and negative obstacles in the absence of crop or in emerging crop conditions; and not require "supervised learning" or large amounts of requisite data for underlying models.

In one embodiment, the perception module 105 detects objects as follows: depth information is computed from at least one stereo camera, or alternatively a pair of stereo cameras, and a lidar point cloud, which are projected into a local reference frame. These points are accumulated over time in a global coordinate frame as provided by the pose received from the pose estimation module 104, to supply temporal cohesion and resilience to temporary occlusion. Next, voxels, or data points from a three-dimensional grid, from a relevant slice of the map are clustered to get objectness-score using one of two methods. In a first method, the score is determined from a rules-based assignment. In a second method utilizing machine learning processes, features are computed on the three-dimensional points and can include density, height distribution, and position (empirically outperformed normals, curvature, manifold projections, and edge features). A Gaussian Mixture Model (GMM) is re-centered using a K++ algorithm along with expectation-maximization (EM) iterations to produce a soft cluster. Clusters are merged by minimizing divergence. Using either method, a rules-based non-maxima suppression assigns clusters of points to objects. If objects are not currently visible, they are decayed over time. Objects are returned that exist in the map within a C-space-expanded view of the current trajectory that satisfy a set of simple rules, such as distance from the vehicle 11, minimum size from the ground surface, and minimum number of observations. Next, the model of the ground surface is updated using non-obstacle points. In some embodiments, random sample consensus (RANSAC) and least squares (LS) optimization can be performed. In alternative embodiments, Bayesian updating is performed on assumed family of gaussian distributions to update using the new surface point founds. Using this process, the perception module 105 provides a convex hull of the obstacle path, which is recorded and sent over to the obstacle avoidance module 107.

Path planning and path correction is provided by the path navigation module 106 and obstacle avoidance module 107. The path navigation module 106 tracks the vehicle 11 and sends navigation updates to the interface control module 103. This module receives a list of way-points from the off-board controller 102. That is, the path navigation module 106 performs way-point bookkeeping and tracking. These way-points are then sequentially passed into a curve check test which computes the turning radius required for the points. If the turning radius is smaller than the minimum turning radius of the machine, the points are passed to a Dubins smooth path generator that returns the navigable way-points. The path navigation module 106 then sends a buffer for way-points to the interface control module 103 for motion execution.

The obstacle avoidance module 107 implements planning to avoid obstacles. For example, the perception module 105 provides obstacle hulls and a traversability cost map that is a function of detected obstacles and occlusion scores in the voxel map. The cost map does not consider a particular crop traversed by the vehicle 11, for example, which may have a lower traversability cost than other obstacles, but the information is available to the system. If obstacles are in the path of the vehicle 11, two methods of planning to avoid obstacles are implemented. In a first method, or gradient descent based method, gradient descent is used on the cost map, with a regularization term to ensure the motion constraints of the vehicle 11. In a second method, or Hybrid A Star Planner method, the cost map is considered to convert the discrete space into continuous graph using motion updates. All nodes that are not executable by the vehicle 11 are marked with high cost. Using Dubins motion update, a child node is computed to the parent location. In this embodiment, two heuristics are used: (1) Euclidean distance to the closest threshold point on the row; and (2) a spacing heuristic, which prefers nodes that are fixed factors of spaces of the implementation unit width and are assigned lower cost than neighbors. Each way-point step is considered uniform cost. Thus, the planner ensures the shortest path due to consistency and admissibility of the graph. Further, the planner ensures that the vehicle 11 can execute the path as it accounts for the minimum turning radius into child node exploration.

The remote operation module 108 sends the machine states and local sensor (e.g., images) updates to the remote off-board controller 102. The remote operation module 108 is also responsible for maintaining and connecting to the off-board controller 102 through the execution of the mission. If the off-board controller 102 is out of reach, the vehicle can be stopped via the remote operation module 108. If stopped, the module 108 then tries to re-establish connection with the off-board controller 102. In one embodiment, the remote operation module 108 can also ensure that the vehicle 11 stays within an operational geofence. If for some reason the vehicle 11 goes out of the geofence, a stop message is triggered and an alert is sent to the off-board controller 102.

The onboard controller 101 further includes architectural safety mechanisms, which are used to provide a stable and safe operation of the vehicle 11. For example, in one embodiment, the architectural safety mechanisms includes a parallel computation pipeline that enables redundancy and/or checks on system computations. In another embodiment, the mechanisms includes as design that abstracts local components for modularity, which allows algorithmic components to be parameterized. The pose-filtering, ground-modelling, and classification algorithms are examples of parameterized components, with subcomponents leveraging the same design. Other features of architectural safety mechanisms include low-overhead data transfer across distributed infrastructure, logging support for a wide variety of data, including sensor data in order to recreate system performance offline, high speed compression for image streaming to the user interface 155 (in this embodiment, an algorithm applies a stochastic partial SVD on image differences, with periodic keyframes to remove artifacts, that balances the fidelity of the image in real time by adjusting the rank of the decomposition); global state machine to monitor autonomy state of the vehicle 11 incorporating the readiness of individual components with low-latency; and several levels of redundancy in safety systems, including in path integrity, path transmission, and digital fencing.

Figure 1B:
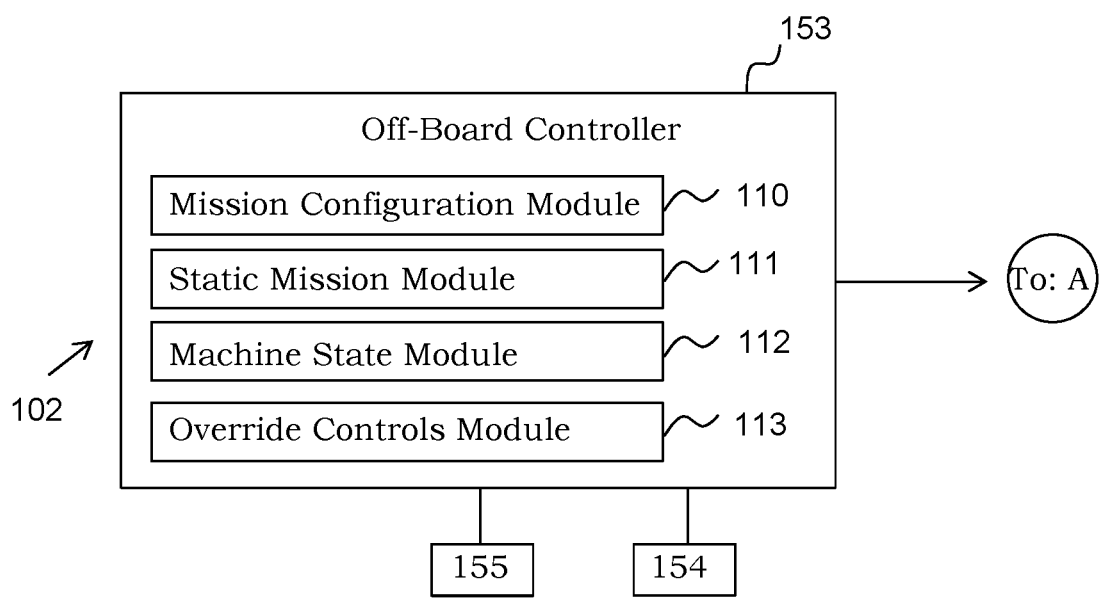

Referring now to FIG. 1B, the off-board controller 102 is responsible for developing the initial configuration for the mission, static path planning, and monitoring the state of the vehicle 11. The user interface 155 associated with the off-board controller 102 also enables a user to overload the controls of the vehicle 11 manually.

To develop the mission, the mission configuration module 110 allows a user to select the details of the application and mission parameters, which are used to in executing navigation. The details can include identification of the geofence, the application rate, maximum navigation speeds, the width of implements on the vehicle 11, turning threshold of the vehicle 11, threshold conditions for refueling, and enabling/disabling data logging capabilities. Using the mission configuration module 110, users can also define the location of refueling stations (or tender station) on a map. For example, a user can upload a GPS coordinate or manually select a location of refueling stations on a map interface, such as Google Maps. The output of the mission configuration module 110 defines the limits to the navigation along with the initial map of the region to be traversed by the vehicle 11. A user can define application region by either uploading a shape-file or manually selecting the region on a map interface built into the off-board controller 102.

The static mission module 111 uses the output of the mission configuration module 110 to generate custom way-points that cover the desired regions of the fields along with potential refueling paths or exit points. The static mission module 111 has two components, a coverage component and a tender component.

The coverage component of the static mission module 111 generates way-points using a multi-plane raster scan algorithm along the application region. The rows of way points generated are spaced based on the application unit width defined in the mission configuration module 110. In one embodiment, a user can also define certain rows of plants to be skipped using the coverage component. In some embodiments, the coverage component generates a semi-circular path at the end of each row of plants using Dubins Path Planning algorithm. The semi-circular path accounts for a minimum turning radius of the vehicle 11 to ensures that the path generated will be safely executable by the vehicle 11. The list of final way-points can be checked and smoothed to account for the vehicle 11 motion profile.

The tender component of the static mission module 111 generates a list of way-points at a decision node in the navigation graph. The way-points lead the vehicle 11 from a particular decision point to the refueling (tender) location. Decision points are generated on the application map based on exit row locations and Euclidean closeness to the tendering location. The way-points are generated such that minimum crop is run over during navigation, such as when the vehicle 11 is turning at the end of a row. The cost heuristic is used to calculate a merge point to a particular headland. The tender component can also define the return behavior after refueling. The return behavior is subjected to a navigational area available to return to the last working row. In one embodiment, the return behavior is a 'turn in headland and return' (defined using Dijkstra's Algorithm) behavior. In an alternative embodiment, the return behavior is a 'light-bulb turn and return' (defined using Dubins Path Algorithm) behavior. The output of the static mission module 111 is a list of way-points classified as 'normal' and 'tender' Points. The list of way-points can be sent to the vehicle 11 via the data port 151 and wireless link 154, such as a wireless serial communication device.

The machine state module 112 enables the off-board controller 102 to display certain machine information to a user. The onboard controller 101, via the remote operation module 108, transmits essential state information for the vehicle 11 and its various components. The state information can be displayed to the user using interactive markers and state estimation graphics. The information displayed on the user interface 155 can include: vehicle health status (e.g., failure checks); vehicle state estimations (e.g., fuel, component temperatures, engine diagnostics, and similar data); mission state (e.g., completion status, mission bird's-eye-view display, and vehicle location); image data; and other sensor data. The machine state module 112 also ensures that the off-board controller 102 is connected to the vehicle 11 during mission execution. If there is any break in communication, the machine state module 112 tries to re-establish the connection. In other embodiments, the machine state module 112 can send a distress signal if the vehicle 11 crosses a geofence, which defines the area in which the vehicle 11 should be operating. The distress signal interrupts the mission and sends out stop signal. Notable, this is a redundant feature as the onboard controller 101 performs a similar function.

The off-board controller 102 also includes an override controls module 113, which enables a user to override autonomous operation. For example, the user can override autonomous controls to instruct the vehicle 11 to perform behaviors related to core operations, mission operations, and path correction operations. For core operations, the user can instruct the vehicle to start a mission, stop, pause a mission, kill the engine, and start the engine. For mission operations, the user can instruct the vehicle to resume a path from the last recorded application row, resume a mission from the vehicle's current location, force a tender at the next decision node, ignore an output from the perception module 105, ignore an obstacle, ignore state machine status, and follow breadcrumbs. In one embodiment, override messages are sent as a 16-bit message to the onboard controller 101, where the message is repeatedly sent until proper execution of the override message is observed. Other communication protocols can be used in alternative embodiments. For path correction operations, the user can mark general way-points on the map for the vehicle 11 to follow and select way-points by tapping on a map interface. The defined way-points are assigned the highest priority for execution after the 'follow breadcrumb' controls are activated. In one embodiment, the way-points are passed through a Dubins Path Planner algorithm to ensure that the resultant path is smooth and executable by the vehicle 11.

While the disclosure has been described in detail and with reference to specific embodiments thereof, it will be apparent to one skilled in the art that various changes and modification can be made therein without departing from the spirit and scope of the embodiments. Thus, it is intended that the present disclosure cover the modifications and variations of this disclosure provided they come within the scope of the appended claims and their equivalents.

What is claimed is:

1. A system for controlling a vehicle operating autonomously in an agricultural field and having at least one sensor capable of providing data related to an environment of the vehicle, the system comprising:
   an onboard controller connected to a data port on the vehicle for receiving the data and developing a navigation plan, the onboard controller comprising:
      an interface control module that provides instructions to low-level controllers to execute the navigation plan,
      a pose estimation module that estimates a pose of the vehicle with respect to a global frame,
      a perception module that identifies obstacles within a vicinity of the vehicle,
      a path navigation module that tracks the vehicle and sends navigation updates to the interface control module, and
      an obstacle avoidance module that plans a path to avoid the obstacles identified by the perception module;
   an off-board controller that sends mission data and a set of way-points to the onboard controller,
      wherein the onboard controller develops the navigation plan based on at least one of the mission data and the set of way-points, and
      wherein the set of way-points define a path to cover an area of the agricultural field identified in the mission data.

2. The system of claim 1, wherein the off-board controller comprises:
   a mission configuration module that receives mission details from a user to generate a mission output;
   a static machine module that receives the mission output and generates the set of way-points used by the onboard controller to develop the navigation plan.

3. The system of claim 2, wherein the off-board controller further comprises:
   a machine state module that receives state data from the vehicle and displays the state data on a user interface.

4. The system of claim 2, wherein the mission details are selected from a group consisting of application area, application rate, navigation speed, vehicle width, vehicle turning threshold, and refueling threshold.

5. The system of claim 2, wherein the way-points comprise tender and normal way-points.

6. The system of claim 1, wherein the off-board controller further comprises:
   an override controls module that sends override data to the onboard controller, wherein the override data interrupts autonomous operation of the vehicle.

7. The system of claim 6, wherein the override data comprises a message related to the mission data.

8. The system of claim 6, wherein the override data comprise a message when received by the onboard controller causes the vehicle to stop.

9. The system of claim 1, wherein the onboard controller further comprises:
   a remote operation module that receives data from the at least one sensor and transmits the data to the off-board controller for display on a user interface.

10. The system of claim 1, wherein the low-level controllers are selected from a group consisting of a steering controller, a braking controller, and a propulsion controller.

11. The system of claim 1, wherein the pose estimation module estimates the pose of the vehicle by using an extended Kalman filter that assumes a uniform velocity model.

12. The system of claim 11, wherein the pose is updated using data from the at least one sensor.

13. The system of claim 1, wherein the perception module creates a map in a global coordinate frame using data from the at least one sensor.

14. The system of claim 1, wherein the perception module identifies objects in the environment without reliance on image features.

15. The system of claim 1, wherein the off-board controller is connected to the data port via a wireless link.

16. The system of claim 1, wherein the at least one sensor is selected from a group consisting of: an imaging system, a stereo camera, a radar system, a lidar system, a location-determining receiver, a satellite navigation receiver, a dead-reckoning sensor, an odometer, a gyroscope, an accelerometer, an inertial measurement unit, and a tilt, roll, and yaw sensor.

17. The system of claim 1, wherein the data comprises at least one of position data, motion data, and attitude data.

18. A method of controlling an autonomous vehicle operating in an agricultural field and having an onboard controller comprising:
   generating mission data and a set of way-points using an off-board controller,
      wherein the mission data comprises an initial map of a region to be traversed by the autonomous vehicle, and
      wherein the set of way-points define a path to cover the region;
   receiving the mission data and set of way-points at an onboard controller;
   developing a path plan using at least one of the mission data and set of way-points;
   determining a pose of the vehicle;
   navigating the path plan by tracking the set of way-points; and
   detecting objects within the path plan using a sensor, wherein the sensor provides information about an environment surrounding the autonomous vehicle.

19. The method of claim 18, where detecting objects comprises:

computing depth information from a stereo camera and a lidar point cloud having a plurality of points, wherein the points are projected into a local reference frame;

accumulating the plurality of points over a period of time in a global coordinate frame identified in the pose;

clustering voxels from the global coordinate frame voxel clusters; and determining an objectness-score based on the voxel clusters.

20. The method of claim 19, further comprising:

identifying an object using the objectness-score.

* * * * *